United States Patent [19]

Sathi et al.

[11] Patent Number: 5,216,754
[45] Date of Patent: Jun. 1, 1993

[54] DETERMINING THE COMPLEXITY OF A PAGE PRIOR TO A PRINT ATTEMPT

[75] Inventors: Kitty Sathi, Pittsford; Andrew D. Post, Victor; Richard T. Lauria, Penfield; Keith A. May, Macedon, all of N.Y.; Gary Padlipsky, Hawthorne, Calif.

[73] Assignee: Xerox Corporation, Stamford, Conn.

[21] Appl. No.: 952,200

[22] Filed: Sep. 28, 1992

Related U.S. Application Data

[63] Continuation of Ser. No. 750,784, Aug. 27, 1991.

[51] Int. Cl.[5] .............................................. G06K 15/00
[52] U.S. Cl. .................................... 395/113; 395/115
[58] Field of Search ............... 395/101, 112, 113, 114, 395/115, 116, 164; 358/296, 404, 444; 340/798, 799; 346/154

[56] References Cited

U.S. PATENT DOCUMENTS 4,860,119  8/1989  Maniwa et al. .................... 358/296
4,896,275  1/1990  Jackson ............................. 395/101

Primary Examiner—Arthur G. Evans
Attorney, Agent, or Firm—Oliff & Berridge

[57] ABSTRACT

An electronic printing system prevents printing failures and interruptions associated with the inability of an image generation subsystem to generate a page image in digital form in real-time by reviewing the page contents prior to submission to the image generation subsystem. The quantity, size, geometry and location of objects on a page are analyzed to generate an internal intermediate description of the page. A determination is made if sufficient resources exist to perform real-time imaging. If real-time imaging cannot be performed, the page will be automatically simplified before the job containing the page is submitted for printing.

10 Claims, 14 Drawing Sheets

|  | Number of instructions | Number of objects processed in one band time |
|---|---|---|
| Normal characters | 74 | 518 |
| Rectangular windowed characters | 85 | 451 |
| Trapezoidal Windowed characters | 95 | 404 |
| Rectangular rules | 48 | 800 |
| Trapezoidal rules | 59 | 650 |
| Adaptive compressed image | 139 | 276 |
| Trapezoidal images | 162 | 237 |
| Link entries | 16 | 2400 |

*FIG. 3*

|  | Rule | Trapezoid | Characters | | | | Images | |
| --- | --- | --- | --- | --- | --- | --- | --- | --- |
|  |  |  | Normal | Rectangular windowed | Trapezoidal windowed | | Normal | Rectangular and Trapezoidal windowed |
| dlist parameter block overhead | 16 words | 24 words | 24 + yLength in words | 24 + yLength in words | 24 + yLength in words | | 32 + yLength in words | 32 + yLength in words |
| newlist parameter block overhead | 10 words | 18 words | 14 words | 16 words | 18 words | | 27 words | 31 words |

FIG. 4

| Object type | VG processing overhead |
|---|---|
| Rule | 110 + 2 * xLength in words per band |
| Trapezoid | 130 + 2 * xLength in words per band |
| character | 80 + xLength in words per band<br>Note: characters are aligned in y dimension |
| Normal non-magnified image (forward-reverse) scan | 130 + 2 * xLength in words per prediction break in band |
| Normal magnified image (forward-reverse) scan | 200 + 2 * xLength in words per prediction break in band |
| Tiled non-magnified image (forward print) | 130 + 2 * xLength in words per tile in band<br>Note: If tile is partially off the leading edge of the page then partial area of the tile is added to the totalArea of the first band |
| Tiled non-magnified image (reverse print) | 130 + 2 * xLength in words per tile in band<br>Note: This overhead is added to the full area of the tile even if the tile crosses band boundaries (i.e., this tile starts in the next band and ends in the current band. |
| Tiled magnified image (forward print) | 200 + 2 * xLength in words per tile in band<br>Note: If tile is partially off the leading edge of the page then partial area of the tile is added to the totalArea of the first band. |
| Tiled magnified image (reverse print) | 200 + 2 * xLength in words per tile in band<br>Note: This overhead is added to the full area of the tile even if the tile crosses band boundaries (i.e., this tile starts in the next band and ends in the current band. |

FIG. 5

(New list array)

On a zPlane change set all areas to be the maxNewListArea. At the end of the page, the max new list area is checked against the threshold and if this value exceeds the threshold the document needs to be directed to the G-board.

Threshold
= 149760
words
(Meridian)

| 70000 | 70000 | 70000 | 70000 |

Video Channel #1 NLArea (wrds) | Video Channel #2 NLArea (wrds) | Video Channel #3 NLArea (wrds) | Video Channel #4 NLArea (wrds)

*FIG. 8*

(old list processing)

Object 1, 2 and 3 start in band n and cross into the next band. If this is the order that they go into the bands list, then when processing band n they will be processed in the same way. When processing band n+1, the IG is going to process object 2,3, and 1. The order of oldlist processing depends on the area of the objects in previous band.

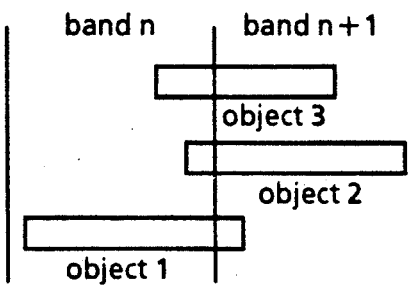

*FIG. 9*

(old list loading extimation)

Let $n$ = number of video channels, i IN [1..n]
$h_{ik}$ = Area of object in channel i
$H_i$ = Total area in channel i = $\Sigma_k h_{ik}$
$T$ = Total area in all channels = $\Sigma_i \Sigma_k h_{ik}$
$A$ = Average Area = $T/n$ Proposed measure is that $A + \max_{ik} h_{ik}$ is a good estimate
For this work,
    For all i:     $A + \max_{ik} h_{ik} >= H_i$
This expands to:
    For all i:     $(\Sigma_i \Sigma_k h_{ik})/n + \max_{ik} h_{ik} >= \Sigma_k h_{ik}$ Let l be the most loaded channel
    Therefore, for all i: $\Sigma_k h_{lk} >= \Sigma_k h_{ik}$
Then    $\Sigma_i \Sigma_k h_{ik} + n(\max_{ik} h_{ik}) > n(\Sigma_k h_{ik})$ Proof of contradiction:
    Assume $\Sigma_i \Sigma_k h_{ik} + n(\max_{ik} h_{ik}) < n(\Sigma_k h_{lk})$
         $\Sigma_i \Sigma_k h_{ik} < n(\Sigma_k h_{lk} - \max_{ik} h_{ik})$
    But, natural loading ensures
         $\max_i \Sigma_k h_{ik} - \min_i \Sigma_k h_{ik} <= \max_{ik} h_{ik}$
  or      $\Sigma_k h_{ik} - \min_i \Sigma_k h_{ik} <= \max_{ik} h_{ik}$
This constraint implies
         For all i : $\Sigma_k h_{ik} >= \Sigma_k h_{lk} - \max_{ik} h_{ik}$
So      $\text{Inf}[\Sigma_i \Sigma_k h_{ik}] >= n(\Sigma_k h_{lk} - \max_{ik} h_{ik})$
But, this contradicts the assumption that
         $\Sigma_i \Sigma_k h_{ik} < n(\Sigma_k h_{lk} - \max_{ik} h_{ik})$
         Therefore, $\Sigma_i \Sigma_k h_{ik} + n(\max_{ik} h_{ik}) >= n(\Sigma_k h_{ik})$ and
         $A + \max_{ik} h_{ik} >= H_i$

*FIG. 10*

DETERMINING THE COMPLEXITY OF A PAGE PRIOR TO A PRINT ATTEMPT

This is a continuation of application Ser. No. 07/750,784, filed Aug. 27, 1991, now abandoned.

BACKGROUND OF THE INVENTION

1. Field of the Invention

The present invention relates to an electronic printing system which generates the page images prior to printing and, more particularly, to an electronic printing system which determines the complexity of a page prior to attempting to print the page.

2. Description of the Related Art

Electronic printing systems rasterize, or generate in digital form, page images prior to transfer to an image output terminal for printing. The rasterization process can be performed in any of a variety of different manners. One rasterization process, for example, comprises the decompression of a simple image received from an associated scanner. A more complicated rasterization process comprises rasterization of some intermediate format generally associated with receipt of image information from a networked work station. For compactness, the intermediate format contains commands describing the line segments, curves, characteristics, images, etc. which must be combined to create a desired page image. Electronic printing systems rasterize the intermediate format prior to printing. This rasterization is commonly performed in real-time as the page image is transferred for a processing operation.

The time required to rasterize a page image is directly related to the complexity of the page image, i.e., the quantity, size and type of objects comprising the page. In some cases, the time required to generate a complex page exceeds the real-time capability of the subsystem which normally performs the real-time rasterization. Such electronic printing systems will detect this condition, abort the page being printed and raise an error message at a display to the user. Recovery methods must then be performed which vary according to the printing system used. At minimum, the user must then remove and discard the aborted page. Alternatively, some electronic printing systems allow the user to select a different operating mode which redirects other system resources to the imaging task.

U.S. Pat. No. 4,896,275 to Jackson discloses a method of converting complex graphics and picture images in binary form into bit map representations which include only image data that is essential for image reproduction by an output printer with limited buffer memory. A block of data is stored at a time in an input buffer, the data being analyzed one byte at a time. Based on the analysis, bit map representations are generated describing only essential data. The essential data contained in the generated bit map representations is transferred to an output buffer along with generated horizontal and vertical positioning information and other parameter information required to reproduce the bit map representation.

The related art thus compensates for memory limitations in an electronic printing system by generating representations including only essential image data. The related art does not address the problems associated with real-time rasterization of complex pages.

OBJECTS AND SUMMARY OF THE INVENTION

One object of the present invention is to provide an electronic printing system which avoids the problems associated with the inability to rasterize complex page images in real-time.

Another object of the present invention is to provide an electronic printing system which avoids the problems associated with the inability to rasterize complex page images in real-time without requiring user intervention.

Another object of the present invention is to provide an electronic printing system which avoids the problems associated with the inability to rasterize complex page images in real-time while avoiding interruption in printer operation.

A further object of the present invention is to provide an electronic printing system which avoids the problems associated with the inability to rasterize complex page images in real-time while maximizing the use of storage space in the system.

To achieve the foregoing and other objects and advantages, and to overcome the shortcomings discussed above, an electronic printing system is provided which reviews the contents of a page prior to submission of the page contents to an image generation subsystem. An internal intermediate description of the page is provided and analyzed to determine the quantity, size and location of objects on a page. A determination is made whether sufficient system resources exist for real-time imaging of the page contents. If the page is determined to be too complex, the system rasterizes the page in background to present a simple bit/pixel image to the image generation subsystem.

BRIEF DESCRIPTION OF THE DRAWINGS

The invention will be described in detail with reference to the following drawings in which like reference numerals refer to like elements and wherein:

FIG. 3 shows a table illustrating an example of a corresponding relationship between overhead counters and objects;

FIG. 4 shows a table illustrating an example of overhead used for new list and old list parameter blocks;

FIG. 5 shows a table illustrating an example of object types and overhead values associated therewith;

FIGS. 6, 7 and 8 show graphical representations of new list processing;

FIG. 9 shows a graphical representation of old list processing;

FIG. 10 shows an exemplary estimation of old list loading;

DETAILED DESCRIPTION OF THE PREFERRED EMBODIMENTS

Figure 1:
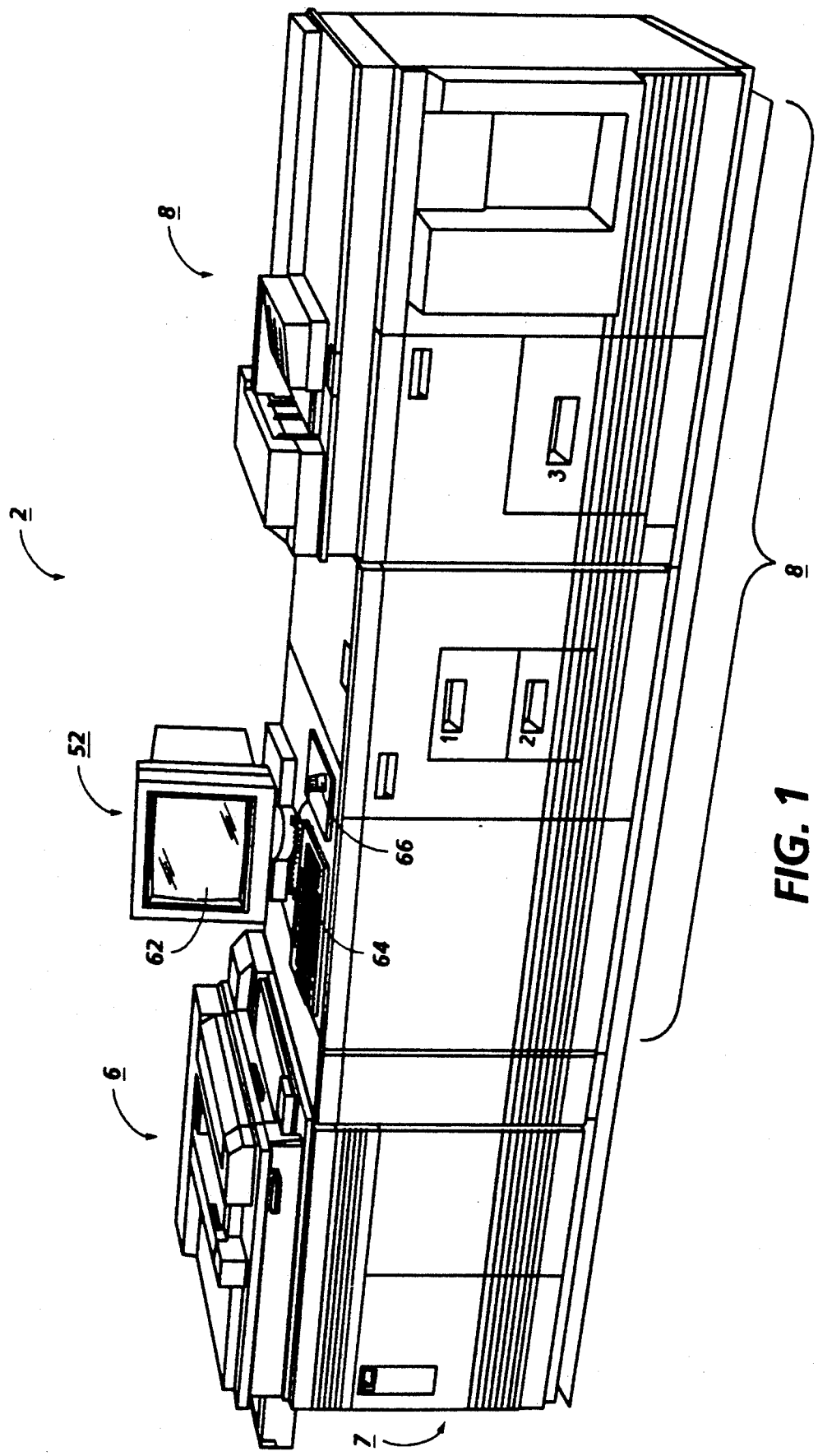
FIG. 1 is a view depicting an electronic printing system of the present invention.
Figure 2:
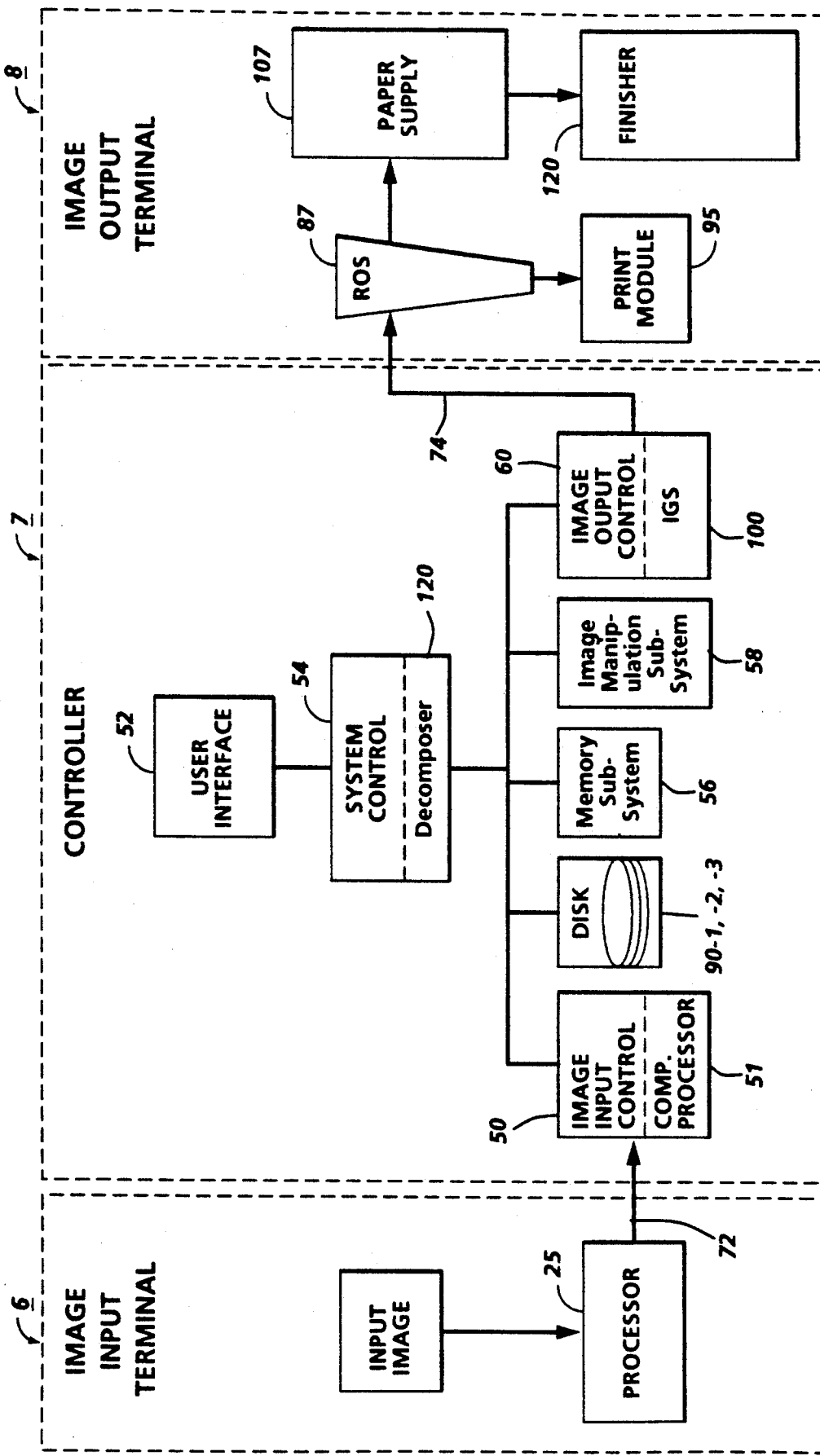
FIG. 2 is a block diagram depicting the elements of the printing system shown in FIG. 1.

Referring now to the drawings, and particularly to FIGS. 1–2 thereof, there is shown an exemplary electronic printing system 2 for processing print jobs in accordance with the teachings of the present invention.

Printing system 2, for purposes of explanation, is divided into an image input terminal 6, a controller section 7 and an image output terminal 8. While a specific printing system is shown and described, the present invention may be used with other types of electronic printing systems.

Image input terminal 6 provides image signals or pixels representative of a scanned image which, after suitable processing by processor 25, are output to controller section 7. Alternatively, a networked work station can be connected to processor 25.

Processor 25 converts the image signals from analog to digital and processes the image signals as required to enable printing system 2 to store and handle the image data in the form required to carry out a programmed job. Processor 25 also enhances and changes the image signals by filtering, thresholding, screening, cropping, reducing/enlarging, etc. Following any changes and adjustments in the job program, analog image signals must again be input to processor 25.

Controller section 7 is, for explanatory purposes, divided into an image input controller section 50, user interface 52, system controller 54, main memory 56, image manipulation subsystem 58 and image output controller 60. The image data input from processor 25 to controller section 7 is compressed by an image compressor/processor 51 of image input controller 50. As the image data passes through compressor/processor 51, it is segmented into slices N scanlines wide. The compressed image data and any related image descriptors providing image specific information (such as height and width of the document in pixels, the compression used, etc.) are placed in an image file. The image files, which represent different print jobs, are temporarily stored in main memory 56 which comprises a random access memory (RAM) pending transfer to the disks 90-1, 90-2 and 90-3 where the data is held pending use.

User interface 52 comprises a combined operator controller/CRT display consisting of an interactive touchscreen 62, keyboard 64 and mouse 66. User interface 52 interfaces the operator with printing system 2, enabling the operator to program print jobs and other instructions to obtain system operating information, instruction, programming information, diagnostic information, etc. Items displayed on touchscreen 62, such as files and icons, are actuated by either touching the displayed item on screen 62 with a finger or by using mouse 66 to point a cursor to the item selected and keying the mouse.

Main memory 56 stores machine operating system software, machine operating data, and image data currently being processed.

When the compressed image data and main memory requires further processing, or is required for display on touchscreen 62 of user interface 52, or is required by printer section 8, the data is accessed in main memory 56. Where further processing other than that provided by processor 25 is required, the data is transferred to image manipulation subsystem 58 where the additional processing steps such as collation, make ready, etc. are carried out. Decomposition is carried out by system control 54. Following processing, the data may be returned to main memory 56, sent to user interface 52 for display on touchscreen 62 or sent to image output controller 60.

Image data output to image output controller is decompressed and readied for printing by an image generation subsystem 100 provided therein. The image data is then sent to printer section 8 for printing. The image data sent is then normally purged from main memory 56 to make room for new image data.

The Image Generation subsystem (IGS) 100 is band-oriented. The page image is segmented into bands, each band being constructed in real-time by an array of Video Generation (VG) channels. The video generation channels feed a pair of band buffers, which are filled/emptied in a ping-pong fashion. The real-time requirements are driven by the image output terminal 8 process speed, since any given band of the page must be "generated" as the previous band is dumped to the image output. For illustrative purposes, controller section 7 maintains a fixed 256 scanline band size. The time available to generate a 256 scanline page segment is determined in accordance with the particular printing system 2 used.

Actual Video Generation time is directly related to the complexity of the page being printed. While the "dump time" to image output terminal 8 remains constant, the amount of time the Video Generation channels spend writing data to the band buffers will depend on the complexity of the page segment being constructed.

Complexity is affected by many factors, including the number of objects (compressed image segments, character bitmaps, rules, etc.) on the page and the geometries of those objects. It is possible to create a composite page comprising a number of objects that cannot be imaged in real-time. According to the present invention, the Image manipulation subsystem 58 can be used to support "simplification" of an arbitrarily complex page into a single raster. A page that has been simplified by the image manipulation subsystem (IMS) 58 will never present a problem to the IGS 100.

If a "complex" page is presented to the IGS 100, a fatal error is detected when the Video Generation time for a given band exceeds what is required for the real-time operation. Printing is suspended for several seconds as the page image is redirected through the IMS 58 for simplification. This type of shutdown is undesirable from a system productivity standpoint, especially when considering that a complex job may require simplification of numerous pages. It is, therefore, desirable for the system to be advised that a complex page exists prior to it being submitted to the IGS 100. The identification of a page that cannot be imaged in real-time is referred to as "Complexity Prediction." Such a page will be automatically simplified before the job containing that page is submitted for printing.

Complexity Prediction

A decomposer 120 performs the Complexity Prediction. Decomposer 120 interprets page description language into a low-level format or bit-map. The output of decomposer 120 is translated by IGS 100. The decomposer 120 generates a "list" of objects for each segment (or band) of the page image. As this "band list" is being generated, statistics are gathered pertaining to the complexity of each object in the band. Upon completion of generation of the band list, these statistics are used to calculate page complexity.

In determining complexity, a number of factors must be considered. An "exact" calculation of page complexity requires precise modeling of the performance of IGS 100. It also requires "tuning" of the decomposer 120 so that objects can be generated in a way that maximizes the bandwidth of IGS 100. As will become apparent from the following discussions, the actual implementation will trade off accuracy in some cases to address performance and system resource concerns. However, the design is based on the fundamental premise that the accuracy of the complexity calculation must not compromise that basic requirement which prohibits failure of a page image in the IGS.

There are two main factors that will cause the IGS 100 not to print a page due to complexity. The first is the overall image area in a band, and the second is the number of objects in the band. An excess of either one alone, or a combination of the two can cause the IGS 100 to "break". Another limitation is memory resources available to load the bandlist, fonts, and images required to print the page.

During print time, the page to be printed is broken into bands which the IGS 100 must image one at a time. The bands are further divided into scan lines. For this example, there are 256 scan lines per band. The time to image a scan line is given at 74.9 usec. The Video channels can output data at approximately 32 Mbits/sec, so at 600 spots per inch (spi), a video channel's theoretical limit is 3.9 inches per scanline. Because overhead functions such as dispatching an object, programming the video channels and state saving must be performed, video channels cannot just process image data continuously. Adding in the time for these "overhead" functions gives the real limit for the amount of data the video channels can process per band.

As discussed above, another limiting factor in determining if a document will print is the number of objects in a band. In a band, there can be both priority important objects and priority unimportant objects. The priority important objects are intended to be located on a different, higher z-plane than the priority unimportant objects within a band. The presence of such objects makes a document more complex. The data structures of IGS 100 have a set size for the number of pointers (both priority important and unimportant) and for the number of objects or parameter blocks that it can hold. It is easy for some documents to exceed this number. To determine complexity, it must be known how many of each type of object (both priority important and unimportant) there are in each band so that a test for both pointer buffer overflow and for parameter block overflow can be performed.

IGS 100 allocates objects for each band to new list and old list parameter blocks. The new list and old list parameter blocks each have a limited memory resource. If an object is located in, for example, two adjacent bands, the object portion located in the band in which the object starts is saved into a new list parameter block. The object portion located in the next band is saved into the old list parameter block. Accordingly, another limiting factor in determining the page complexity is the amount of memory space consumed by the old and new list parameter blocks. If the total number of objects in a band exceeds a predetermined threshold, the page is determined to be too complex. The page is then directed to the IMS 58 before being submitted to IGS 100. The decomposer 120 keeps track of the old list and new list parameter block size (in words) required to process each band. For each new object or state saved object in the band, an overhead based on the size of the parameter block this object generates is added to the new list total or old list total, respectively. FIG. 3 shows a table illustrating an example of a number of overhead counters corresponding to different objects. To determine if the parameter blocks will overflow, these object counters are checked against the allocated size of the parameter block lists, and if an overflow is detected, this page will be marked "complex".

FIG. 4 shows a table illustrating an example of overhead used for new list and old list parameter blocks according to the present invention, where

---

The new list overhead of an object =
MAX[max size of parameter block for the object,
(size of the new list buffer in words/number
of parameter blocks of object type generated
in one band time).

---

After the page is decomposed, i.e., the bandlist, font descriptors and image descriptors that describe the page are fed from the decomposer 120 to the IGS 100. This requires that the bandlist, fonts (descriptors and rasters), and images (descriptors and bitmaps) are available in system memory. There are limitations on the memory resources available for communicating with the image output terminal 8. The complexity predictor also needs to verify that enough memory is available to hold all the data required to image the page.

As illustrated in the table of FIG. 5, different object types have different overhead values associated therewith because of specific routines that must be executed. Complexity can be predicted by adding up the area of everything in a band, adding to this the total overhead to process everything in the band (number of microinstructions), and comparing the total to a predetermined limit of words per band.

The video channels may not have an even distribution of work. The present invention thus includes simulation of the video channel load when calculating the complexity of the page. Parameter Block Generators build the priority important and priority unimportant new lists. As discussed above, these lists describe the objects that start in the current band that is being processed. The objects in these lists are processed in the order that they are put into the bandlist, i.e., in ascending order of z-planes. If a dispatcher detects a z-plane change and all the video channels are not idle, the dispatcher waits for the busy video channels to complete processing before proceeding.

Figure 6:
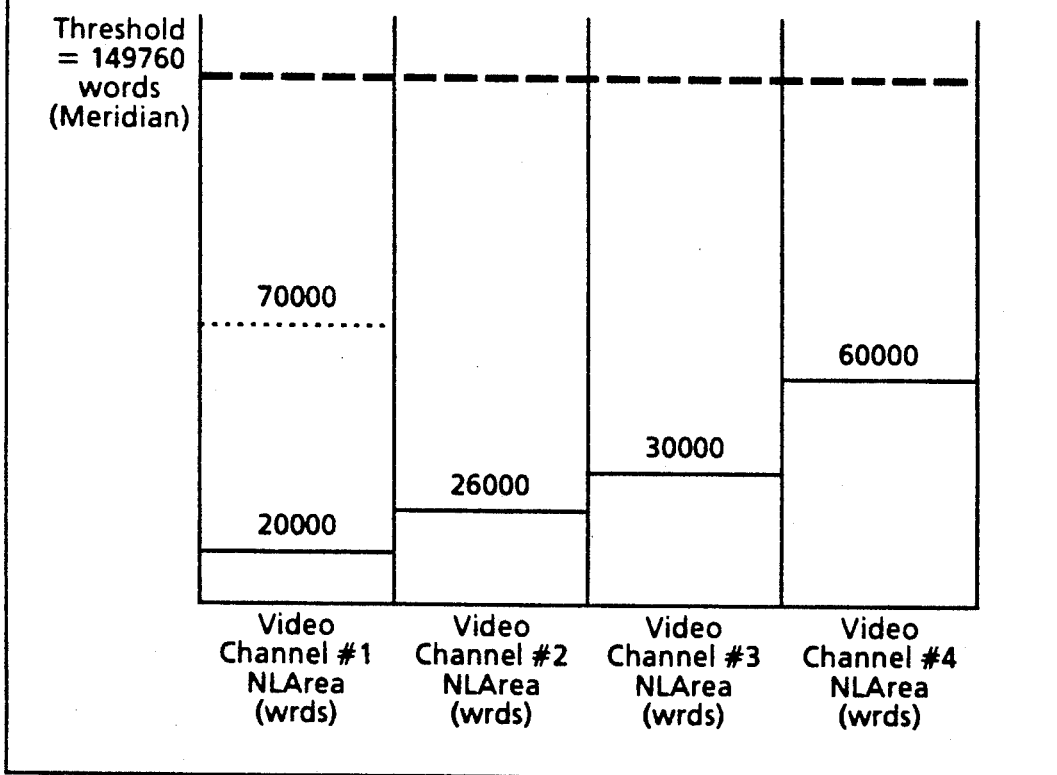
Figure 7:
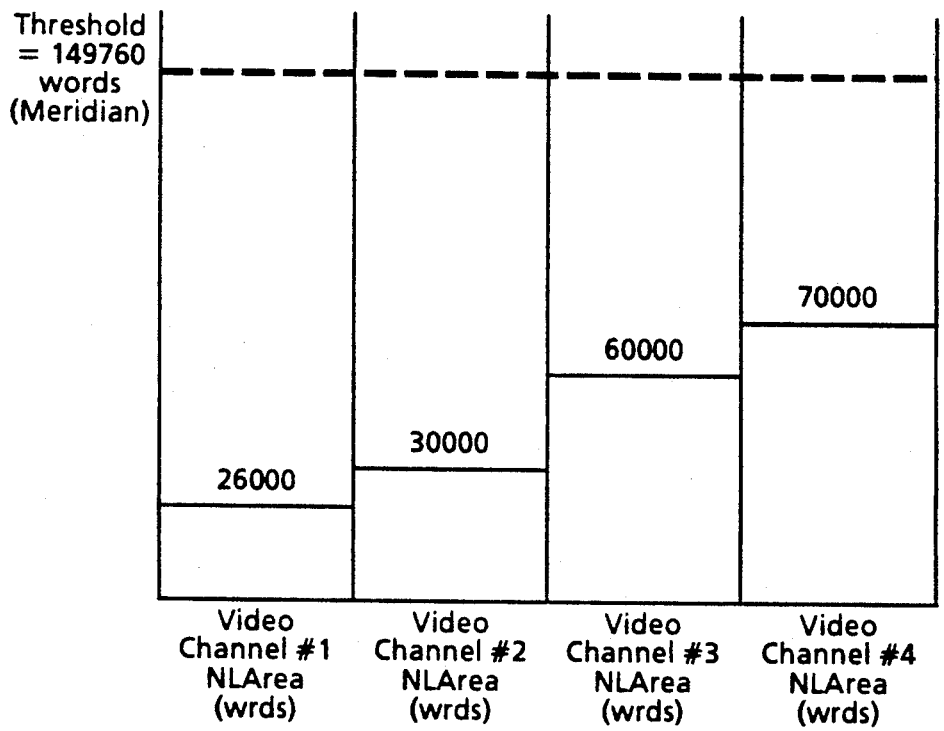

The newlist processing can be simulated easily and accurately by the decomposer 120. This is done by maintaining n separate areas, where n is the number of video channels in the system. This area list is maintained sorted in ascending order. For every object added to the bandlist, the area (plus overhead for processing) of that object needs to be added to the smallest area storage bucket (at the IGS 100, the video channel that will be available first will get the object) and then the area list is sorted. On a z-plane change or end of page, all of the video channel area storage buckets are set to be equal to the largest area storage bucket. FIGS. 6, 7 and 8 describe this graphically.

If an object crosses a band boundary, then the state of the object being processed is saved in the priority important oldlist or the priority unimportant oldlist by the video channel. It is difficult to simulate the old list processing as the processing order of objects cannot be determined. The order in which they are in the bandlist is not the order in which they are state saved. As shown in FIG. 9, this depends on the area in the current band.

It is thus more difficult to simulate old list processing accurately.

For each band, the present invention keeps track of the totalOldListArea (the total area of the objects that are state saved, i.e., the objects that are continued from the previous band). It also keeps track of the largest area for an object within that band. On a z-plane change or end of page, all of the video channel' new list areas are set to the sum of the maxNewListArea, average totalOldListArea, and largest OldListObjArea. If this total exceeds a specified threshold, then this page is redirected to the IMS 58. FIG. 10 proves that this can be used to conservatively estimate old list loading.

In determining page complexity, the types of unique images present on the page must be determined.

The newlist parameter block overhead counter is incremented by a predetermined number of words for each prediction break that starts in the band. This is needed to guarantee that IGS 100 will have enough resources to process the band. The complexity predictor keeps track of number of unique images on the page and total size of the image in pages. This information is needed to guarantee that there will be enough resources to load the image in memory for the IGS 100.

One type of unique image which can affect page complexity is a windowed image, i.e., an image on a page having a boundary such that at least a portion of the images will not be seen. When calculating the area of a windowed image, the present invention uses the y dimension of the image to calculate the area instead of y dimension of the window. This is needed because the video channel generates all the image data even though the image is windowed.

Another factor related to an image which can affect page complexity is the compression factor of an image, i.e., a determination of how well the image will compress. There can be a situation where the compression ratio of an image adds some extra overhead.

Another factor which can affect page complexity is the magnification of images. When images are magnified in the IGS 100, it is very easy to have an uneven distribution of work among the video channels. An example would be a printing system having a plurality of video channels, e.g. eight video channels, with an image which has, for example a 16 scanline prediction break frequency and a magnification value of two. This means the prediction breaks are now 32 scanlines apart and all eight video channels will have something to do. However, if the magnification value is four, the prediction breaks are now 64 and only four video channels will be busy. To account for this, the actual area of the image is calculated and added to the band area.

Another factor affecting page complexity is the prediction break size factor of images. Often, when the prediction break size of an image is large, the present invention determines that there will be an uneven distribution of the area of the band. For example, in a printing system having eight video channels, if the prediction break size of an image is 64, then only four of the eight video channels may be working. In this case, the area will be calculated in each band and added to the band area.

The complexity must be determined on a per band basis. Accuracy cannot be achieved on a per page basis. The area of the image is calculated in each band using the actual dimensions of the object and is added to the band area in which it lies.

When the object comprises text, several complexity factors are considered. The area of a specified character is added to the total area of the band.

The newlist parameter block overhead counter is incremented by a predetermined number of words for each character that starts in the band. This is needed to guarantee that IGS 100 will have enough resources to process the band. The present invention keeps track of the number of unique fonts on the page and total size of the raster metrics in pages for each font. This information is needed to guarantee that enough resources are provided to load the rasters in memory for the IGS 100.

If the character extends into the next band(s), the area of the character is determined based on scanLength and actual scanlines within the band(s).

The overhead for text is a set number of words plus the number of scanlines (xLength).

When the object comprises rules, or rectangular shapes, several complexity factors are considered.

The actual area of the object in the band is calculated and added to the total area for the band. A processing overhead is also added for a rule to the band area. The overhead is (2 times the x length in the current band +110 words per rule).

The newlist parameter block overhead counter is incremented by 12 words for each rule that starts in the band. This is needed to guarantee that IGS 100 will have enough resources to process the band.

If a rule extends into the next band, the area of the object will be calculated and added to the band area.

Figure 11:
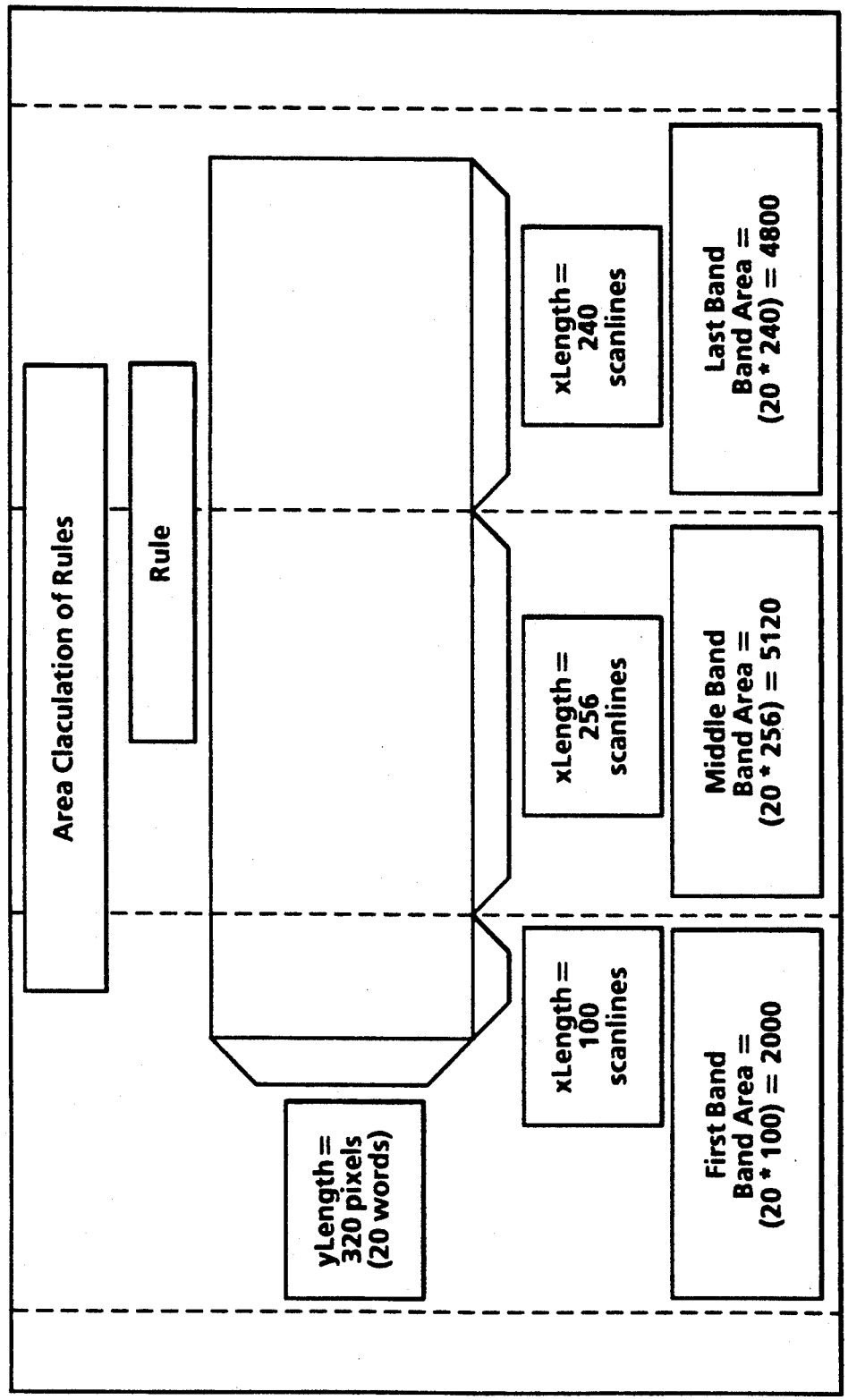
FIG. 11 illustrates the manner in which a rule is divided into smaller rules.

As shown in FIG. 11, the rule is first divided into smaller rules, and then the area of each smaller rule is calculated as follows:

FirstBand and LastBand
   a) Calculate the number of scanlines of the rule in the band b) TotalBandArea = ((yLength/16) + 1) × scanlines MiddleBands:

TotalBandArea = (yLength/16) × 256

The rules are split into smaller rules so that all the Video Channels can work on objects concurrently. To maximize Video Channel productivity, the rules are broken down on word boundaries. There is overhead associated with processing of an object. The decomposer 120 makes sure that the size of the rule is not less than the processing overhead.

Figure 12:
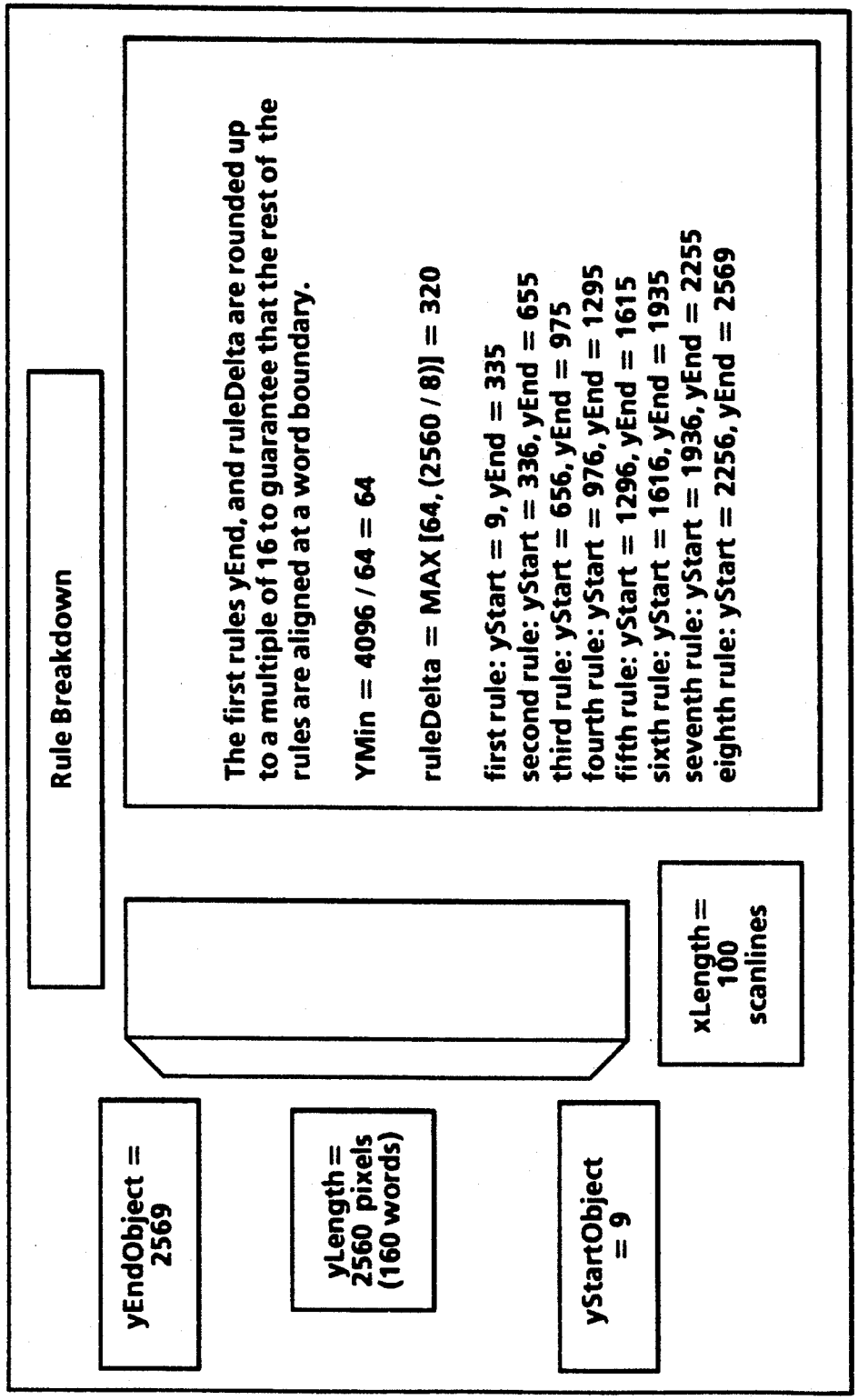
FIGS. 12, 13 and 14 show the manner in which rules are broken down.
Figure 13:
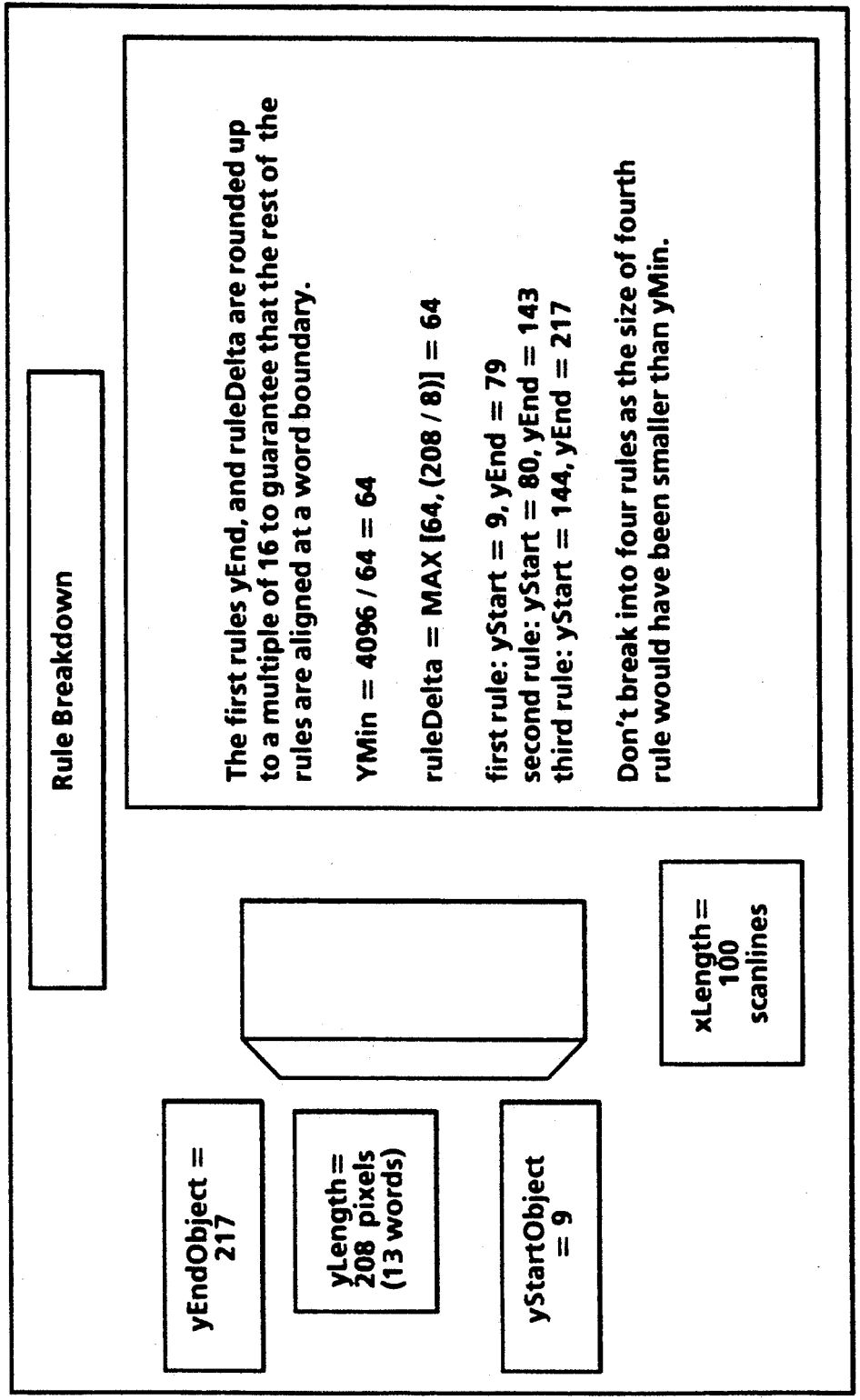
Figure 14:
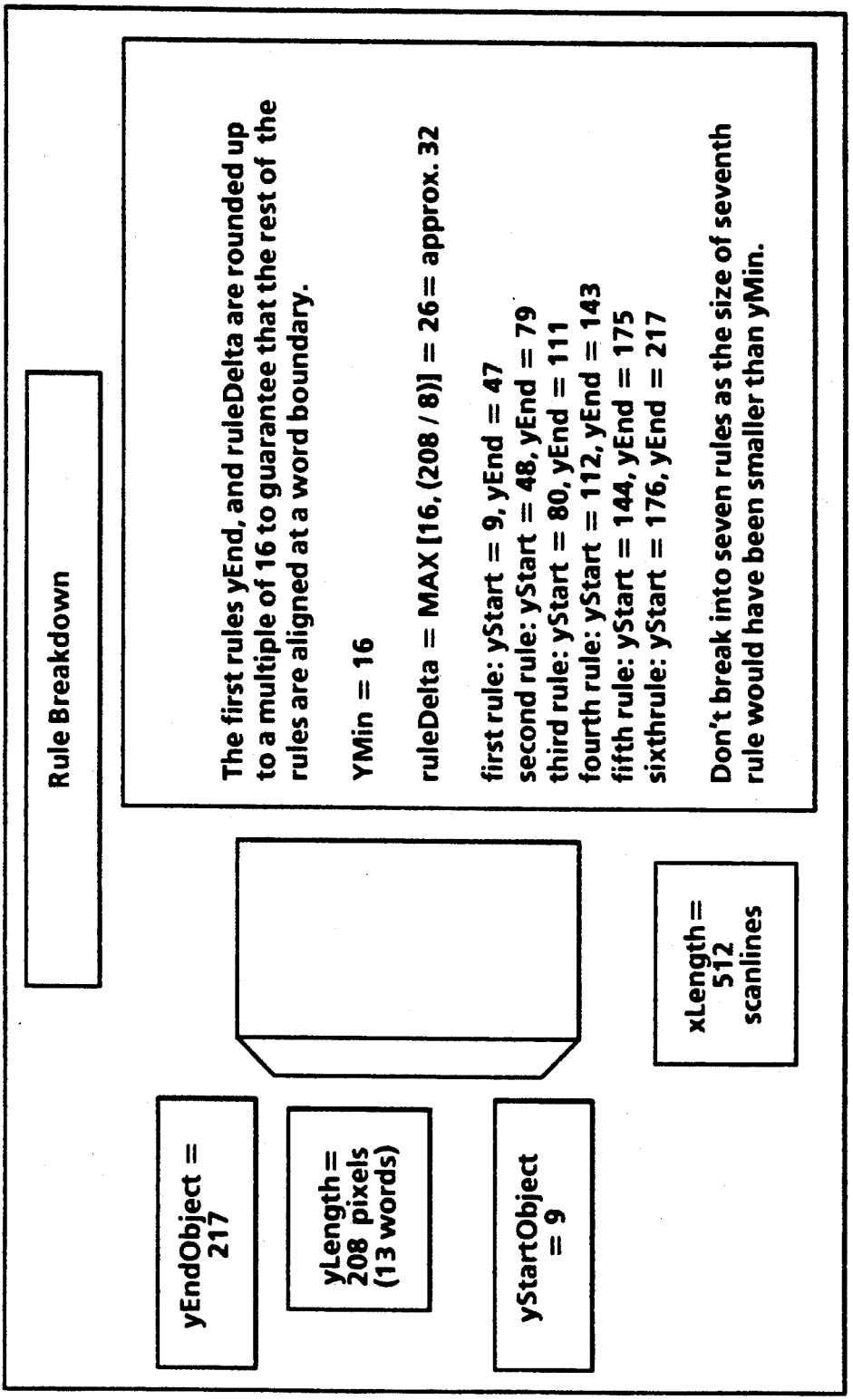

With reference to FIGS. 12, 13 and 14, the rules are split using the following criteria:

--- yMin (the minimum yLength of the rule) =
   16, if xLength > = 256
   4096, if xLength IN [0 . . . 15]
   4096/16, if xLength IN [16 . . . 31]
   4096/32, if xLength IN [32 . . . 63]
   4096/64, if xLength IN [64 . . . 127]
   4096/128, if xLength IN [128 . . . 255]
ruleDelta (the length of smaller rule in y direction) =
MAX[yMin, (yLength/8)]; rounded up to a multiple of 16.
   a) <u>Generate first rule:</u>
      yStart = yStartObject,
      yEnd = YStartObject + ruleDelta
      Align the first rule to a word boundary by rounding up yEnd to a multiple of 16.
   b) yStart = yEnd + 1
   c) yEnd = yStart + rule Delta
   d) if yEnd > = yEndObject then
      yEnd > = yEndObject; Generate Entry; EXIT

```
-continued
e) if yEndObject – yEnd < yMin then
    yEnd > = yEndObject; Generate Entry; EXIT
f) Generate Entry
g) Go to (b)
```

When an object incorporates angles or curves, the object is divided into a plurality of trapezoids. The following factors are considered in determining complexity.

1) The area of the trapezoid is determined by calculating the area of the bounding box. This area is added to the total area for the band. A processing overhead is also added for a trapezoid to the band area. The overhead is (2 times the X length in the current band + 130 words per trapezoid).

2. The newlist parameter block overhead counter is incremented by 22 words for each trapezoid that starts in the band. This is needed to guarantee that IGS 100 will have enough resources to process the band.

If a trapezoid extends into the next band, the area of the bounding box will be calculated and added to the band area.

Figure 15:
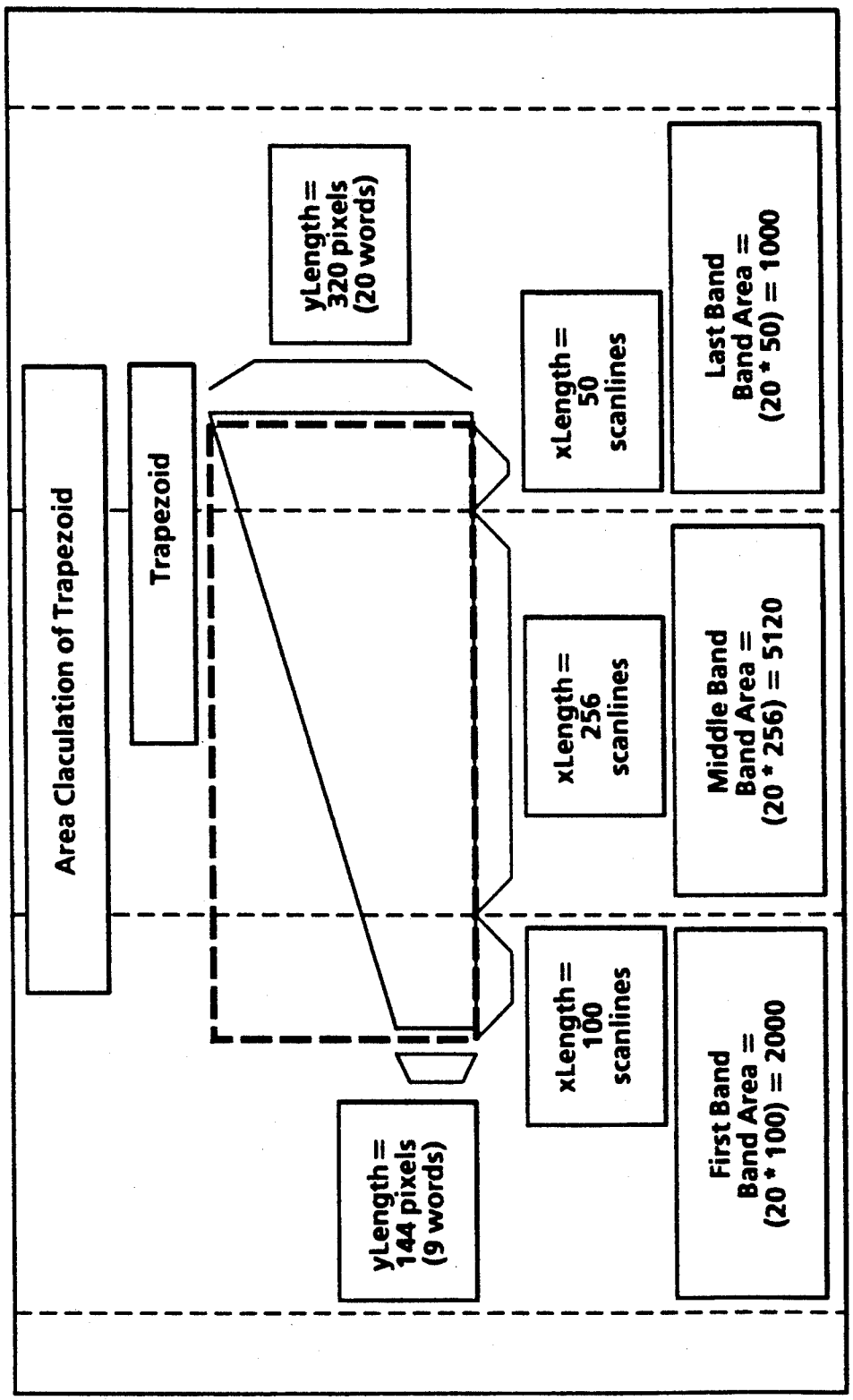
FIG. 15 illustrates the manner in which the area of a trapezoid is calculated.

With reference to FIG. 15, the area of the bounding box is calculated as follows:
First Band and Last Band a) Calculate the number of scanlines of the object in the band b) TotalBandArea = ((maxYLength/16) × 256

The present invention thus determines the complexity of a page being printed. The various factors affecting complexity including the number of objects on the page and the geometries of the objects are evaluated to generate a complexity determination. The complexity determination is performed prior to submission of the page image to the image generation subsystem. If a page has been determined to be complex, i.e., the page cannot be imaged in real-time, the page will be automatically simplified before the job containing the complex page is submitted to the image generation subsystem.

The printing system thus avoids printing failures associated with complex pages by reviewing the page contents prior to submission to the image generation subsystem. The review of the page contents occurs without requiring user intervention, thus improving the overall productivity of the printing system by avoiding interruptions normally associated with page failures attributed to page complexity. In addition, the use of storage space in the system is maximized since most pages are maintained in the compact intermediate format and are not simplified prior to submission to the image generation subsystem unless the pages are determined to be complex.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An electronic printing system having an image input terminal for input of page image data, a controller section for receiving said page image data from said image input terminal and for processing said page image data and an image output terminal for receiving said page image data from said controller section and for printing said page image data, said controller section comprising:
   a band-oriented image generation subsystem for rasterizing said page image data in digital form in real-time, said image generation system segmenting a page image into a plurality of bands, said image generation subsystem submitting said rasterized data to said image output terminal;
   a decomposer for generating a list of objects for each band of the page image to determine whether the page image data to be input to said image generation subsystem can be generated by said image generation subsystem in real-time; and
   an image manipulation subsystem for simplifying said image data before submission of said image data by said decomposer to said image generation subsystem upon determining that said page image data exceeds the real-time capability of said image generation subsystem.

2. The electronic printing system according to claim 1, wherein said page image data comprises a plurality of objects on each of at least one page, said decomposer analyzing at least one of a quantity, size, geometry and type of objects of page to determine whether the image data of the page exceeds the real-time capability of the image generation subsystem.

3. The electronic printing system according to claim 2, wherein said decomposer analyzes all of the quantity, size, geometry and type of objects on the page.

4. The electronic printing system according to claim 2, wherein said controller section divides said image data for each page into a plurality of bands, said decomposer determining whether objects in each of said bands can be generated by said image generation subsystem in real-time, said image manipulation subsystem simplifying the page image data if any of the bands of the page exceeds the real-time capability of the image generation subsystem.

5. The electronic printing system according to claim 1, wherein said image manipulation subsystem simplifies said page image data by converting said page image data to a simple bit/pixel image.

6. A method for increasing productivity in an electronic printing system having an image input terminal for input of page image data, a controller section for receiving said page image data from said image input terminal and for processing said page image data and an image output terminal for receiving said page image data from said controller section and for printing said page image data, said controller section including a band-oriented image generation subsystem for rasterizing said page image data in digital form in real-time, said image generation system segmenting a page image into a plurality of bands and submitting said rasterized data to said image output terminal, said method comprising:
   generating a list of objects for each band of the page image to determine whether the page image data to be input to said image generation subsystem can be generated by said image generation subsystem in real-time; and
   simplifying said page image data before submission of said page image data to said image generation subsystem upon determining that said page image data exceeds the real-time capability of the image generation subsystem.

7. The method according to claim 6, wherein said page image data comprises a plurality of objects on each of at least one page, said determining comprising analyzing at least one of a quantity, size, geometry and type of objects of a page to determine whether the image data of the page exceeds the real-time capability of the page generation subsystem.

8. The method according to claim 7, wherein said determining comprises analyzing all of the quantity, size, geometry and type of objects on the page.

9. The method according to claim 7, wherein said determining comprises dividing said image data for each page into a plurality of bands and determining whether objects in each of said bands can be generated by said image generation subsystem in real-time, said simplifying including simplifying the page image data if any of the bands of the page exceeds the real-time capability of the image generation subsystem.

10. The method according to claim 6, wherein said simplifying comprises converting said page image data to a simple bit/pixel image.

* * * * *